United States Patent [19]

Hallberg et al.

[11] Patent Number: 4,755,304
[45] Date of Patent: Jul. 5, 1988

[54] METHOD OF PURIFYING GROUND WATER

[75] Inventors: Rolf O. Hallberg, Tyresö ; Rudolf H. Martinell, Täby, both of Sweden

[73] Assignee: Four Seasons Venture Capital AB, Sweden

[21] Appl. No.: 816,296

[22] Filed: Jan. 6, 1986

[51] Int. Cl.$^4$ ............................................... C02F 3/04
[52] U.S. Cl. .................................. 210/747; 210/611; 210/617; 210/622; 210/901; 210/908; 210/721; 405/52; 405/129; 435/262
[58] Field of Search ................... 405/128, 129, 36, 52; 210/170, 747, 610, 611, 721, 617, 622, 901, 908; 435/281, 262; 166/246

[56] References Cited

U.S. PATENT DOCUMENTS

| | | |
|---|---|---|
| 2,352,832 | 7/1944 | Gunderson . |
| 3,649,533 | 3/1972 | Reijonen et al. . |
| 3,846,290 | 11/1974 | Raymond ............................ 210/610 |
| 4,167,973 | 9/1979 | Forte et al. ......................... 210/908 |
| 4,288,174 | 9/1981 | Laws ................................. 405/129 |
| 4,401,569 | 8/1983 | Jhaveri et al. ...................... 210/747 |
| 4,452,548 | 6/1984 | Balogh et al. ....................... 405/128 |
| 4,576,717 | 3/1986 | Collin et al. ....................... 210/747 |

FOREIGN PATENT DOCUMENTS

| | | |
|---|---|---|
| 2856843 | 7/1980 | Fed. Rep. of Germany . |
| 2542333 | 5/1982 | Fed. Rep. of Germany . |
| 63909 | 10/1955 | France . |
| 354264 | 3/1973 | Sweden . |
| 434388 | 7/1984 | Sweden . |
| 1244065 | 8/1971 | United Kingdom . |
| 1586630 | 3/1981 | United Kingdom . |

OTHER PUBLICATIONS

Halberg, et al. "Vyredox-In Situ Purification of Ground Water", *Ground Water* vol. 14, No. 2, Mar-Apr. 1976.

Niemisto, et al., "A New Effective Method for Removal of Iron from Ground Water", *Vatten*, Feb. 1974, pp. 203-205.

Martinell, Rudolf, Controlled Water Treatment in the Soil-in situ Removal of Iron and Manganese According to the Vyredox Method, *IWSA*, Paris, Sep., 1980.

*Primary Examiner*—Benoît Castel
*Attorney, Agent, or Firm*—Lerner, David, Littenberg, Krumholz & Mentlik

[57] ABSTRACT

A process for the purification of ground water is disclosed which comprises injecting conditioned water into a recharge well, simultaneously withdrawing water from an adjacent recharge well in order to create a purification zone therebetween, and withdrawing purified water from a supply well in an aquifer.

6 Claims, 4 Drawing Sheets

METHOD OF PURIFYING GROUND WATER

This application is a Continuation in Part Application of PCT application Ser. No. PCT/SE84/00170, filed on May 4, 1984, and published as WO No. 85/05098 on Nov. 21, 1985. Priority based upon the filing date of the PCT Application is claimed herein.

FIELD OF THE INVENTION

The present invention relates to the purification of water, such as ground water, infiltrated surface water, artificial ground water, surface water and well water, which encompasses a method or process for removing impurities, dissolved chemicals, ions and the like.

BACKGROUND OF THE INVENTION

In the past, water requiring treatment and purification for removal of iron and manganese was treated in a water treatment plant by adding oxygen to the water. This caused precipitation of impurities which were filtered out to leave purified water. Oxygen was typically added to the water in the form of pure oxygen, or by aeration of the water through the use of a cascade aerator. Because the concentration of oxygen necessary to precipitate metal ions from solution is comparatively low, metals iron and manganese were precipitated through the filtration process described above, wherein the filter encompassed one or more layers of sand through which the water was passed. Capital investment and operating costs for such a purification plant are high since the sand layers which function as the filter material must be regenerated from time to time to enhance the removal of the precipitated metal ions of manganese and iron.

Alternatively, ground water has been purified in situ as described in Swedish Patent Specification No. 6903544-2. Water containing oxygen or oxygen-releasing substances was introduced intermittently into an aquifer through a number of recharge wells or recharge pipes, arranged at a predetermined distance and surrounding a supply well or supply pipe. Oxygenated water introduced in this manner into an aquifer creates a suitable environment for the growth of certain microbes enhancing chemical and metabolic adsorption, oxidation and precipitation of compounds in the existing ground layers, thereby utilizing the ground layers as a reaction and filtration medium. The microbes employed are often sessile '37 gradient" organisms being active primarily in zones created between oxidizing and reducing conditions. Water containing oxygen or oxygen-releasing substances was added intermittently over a period of approximately twenty-four (24) hours. During the addition of oxygenated water or water containing oxygen-releasing substances, the supply well could not be used as a purified water source since concurrent use of the supply well and the recharge wells would cause the failure of the filtration mechanism or a disturbance in its operation, resulting in a deterioration of the quality of water. To supply water on a continuous basis, two or more supply wells or a suitable means for storage has been required to circumvent the above described disadvantages, enabling the withdrawal of purified water to be alternated between at least two supply wells or between the well and the storage means. Regeneration was performed on the dormant supply well or wells if necessary during withdrawal of purified water from the alternate supply source.

When water is withdrawn from a single supply well and conveyed to a recharge well or a plurality of recharge wells to allow concurrent use of the supply well, the flow pattern of recharged water becomes generally parallel to the flow pattern of the water to be purified. When this generally parallel flow pattern is established, a discontinuous radial purification pattern develops between the recharge wells and the supply well without being purified. This gradually reduces the operability of the supply well due to precipitation of iron and manganese which occurs in greatest measure in a smaller portion of the aquifer within close proximity to the supply well. This problem does not occur when using two or more supply wells as previously described, and by alternating the withdrawal of purified water between the supply wells thereby distributing the precipitation over a greater portion of the aquifer.

SUMMARY OF THE INVENTION

An object and advantage of the present invention is the elimination of the need for two or more supply wells, permitting purified water to be pumped continuously from a single supply means by creating a flow pattern between recharge means which is approximately perpendicular to the flow pattern of the water to be purified. in this way, a circumferential purification pattern develops at a sufficient distance from the supply well which distributes the precipitation over a greater portion of the aquifer allowing the operability of the supply well to be maintained.

The present invention can also be used to treat ground water not flowing toward a supply well be creating a linear purification zone approximately perpendicular to the flow of ground water.

The process according to Applicants' invention also enables the continuous filtration and purification of ground water and surface water utilizing a basin or filter mechanism containing any filter material.

Applicants' invention further encompasses a continuous process for purifying water wherein the concentrations of impurities are decreased through the use of an aquifer as a purification medium, or through the use of a man-made filter utilizing any appropriate filter material. In the aquifer, water is intermittently drawn from at least one recharge means, is conditioned and is further introduced into at least one other recharge means. As used herein, the term "supply means" encompasses any means through which water may be induced to flow for treatment or through which water may be withdrawn for water supply. Representative examples of supply means include wells, pipes, siphon tubes, hoses and the like. Similarly, the term "recharge means" as used herein is used to indicate any means by which treated water may be introduced into a filter, basin, aquifer or similar purification or filtration system through which such water is to be purified. However, it is to be understood that "recharge means" are also used to withdraw water for introduction into other recharge means. Representative examples of recharge means include wells, pipes, hoses, tubes and similar devices. The term "conditioned water" as used herein encompasses any physically or chemically treated water which is thereby rendered useful for creating the purification zone.

Impurities typically removed with this system may include inorganic compounds of a chemically reduced state; e.g., $Fe^{2+}$, $Mn^{2+}$, $H_2S$, $HS^-$, $NH_4^+$, $NH_3$ and similar inorganic compounds. Additionally, it is contemplated that this invention effectively reduces or eliminates undesirable concentrations of non-halogenated aliphatic and aromatic hydrocarbons and halogenated aliphatic and aromatic hydrocarbons. Representative examples of non-halogenated and halogenated aromatic hydrocarbons which may be treated for removal or reduction from water include among others, benzene, ethyl benzene, various mono- and polychlorinated aromatic hydrocarbons, toluene and xylene. Similarly, representative examples of halogenated aliphatic hydrocarbons which may be treated for removal or reduction from water includes, among other compounds, mono-, di- and trichloromethane, carbon tetrachloride, di-and trichloroethane, mono- , di- , tri- and tetrachloroethylene, bromodichloromethane, trichlorofluromethane and fluorochloroethane. Examples of non-halogenated aliphatic hydrocarbons include diisopropylether, t-butylmethylether, acetone, methylethylketone (MEK), methylisobutylketone (MIBK), isopropanol, propanol, butanol and 2-butanol.

In the preferred embodiment of Applicants' invention, the abovementioned contaminants are removed in a purification zone created by the introduction of conditioned water into at least one but less than all of the recharge means. The water may be conditioned by adjusting the pH and/or dissolving oxidizing agents or other beneficial agents therein. One such example of a beneficial agent is methane. Oxidizing agents include not only water soluble chemicals and gases, but also microorganisms and all other compositions which may cause the oxidation of impurities or contaminants.

When Applicants' invention is used to purify ground water or to purify water using the underground technology described herein, the Applicants may utilize the metabolic reactions of naturally occuring microorganisms as the mechanism by which precipitation or degradation of contaminants occurs. For example, the microorganisms Crenothrix, Leptothrix and Gallionella have been used to cause the oxidation and/or precipitation of the contaminants iron and manganese in the presence of oxygen. Similarly, by conditioning the water for recharge with different agents, such as methane or nutrients, heterotrophic microorganisms may be induced to oxidize or otherwise metabolically degrade various organic compounds which have contaminated the water. Hence, naturally occuring microorganisms serve in part as one means by which contaminated water may be purified utilizing the Applicants' invention.

During the operation of Applicant's invention, conditioned water is fed to at least one but less than all of the recharge means, and simultaneously with such introduction, water is drawn from at least one recharge means for the purpose of creating a purification zone for the adsorption, transformation, oxidation, precipitation or volatilization of contaminants. In particular, water conditioned with oxidizing agents or other beneficial additives is utilized to reduce the concentration of impurities from untreated water, rendering the water "purified." Feeding conditioned water into the recharge means in this manner creates a purification or filtration zone at a distance sufficiently far from the supply means so as to avoid clogging of the supply means, and maintain adequate flow to the supply means through a purification zone.

The water fed to the recharge means may consist of conditioned water drawn from at least one other recharge means and if desired also a portion of the purified water drawn from the supply means. The preferred embodiments of Applicants' invention disclosed herein will be described in greater detail below with reference to the drawings, wherein:

DESCRIPTION OF THE PREFERRED EMBODIMENTS

Referring in detail to the drawings, water is intermittently drawn from at least one recharge means, designated generally as numbers 10 through 15, conditioned to render it suitable for recharge into at least one recharge means and conveyed to at least one other recharge means. Simultaneous with the recharge, water may be withdrawn from the supply means 27. The water drawn from the supply means is typically purified water, having had the contaminants precipitated therefrom by the microbiological metabolic oxidative process described above.

The conditioned water is introduced into a predetermined number of recharge means, ranging from one recharge means to as many recharge means as necessary; however, it is to be understood that conditioned water is typically simultaneously introduced into less than all of the recharge means utilized in the system. By changing the plurality of recharge means into which conditioned water is introduced, and by alternating the recharge means from which water is withdrawn, the user effectively alternates the purification zone in which contaminants are precipitated. Any number of recharge means greater than two may be used in this system, depending upon the size of the purfication system, hydrogeologic conditions, biogeochemical conditions, the concentration of impurities contained in the water, etc. Conditioned water may be introduced into the recharge means for a predetermined period, ranging from a few hours to a few days or longer.

Figure 1:
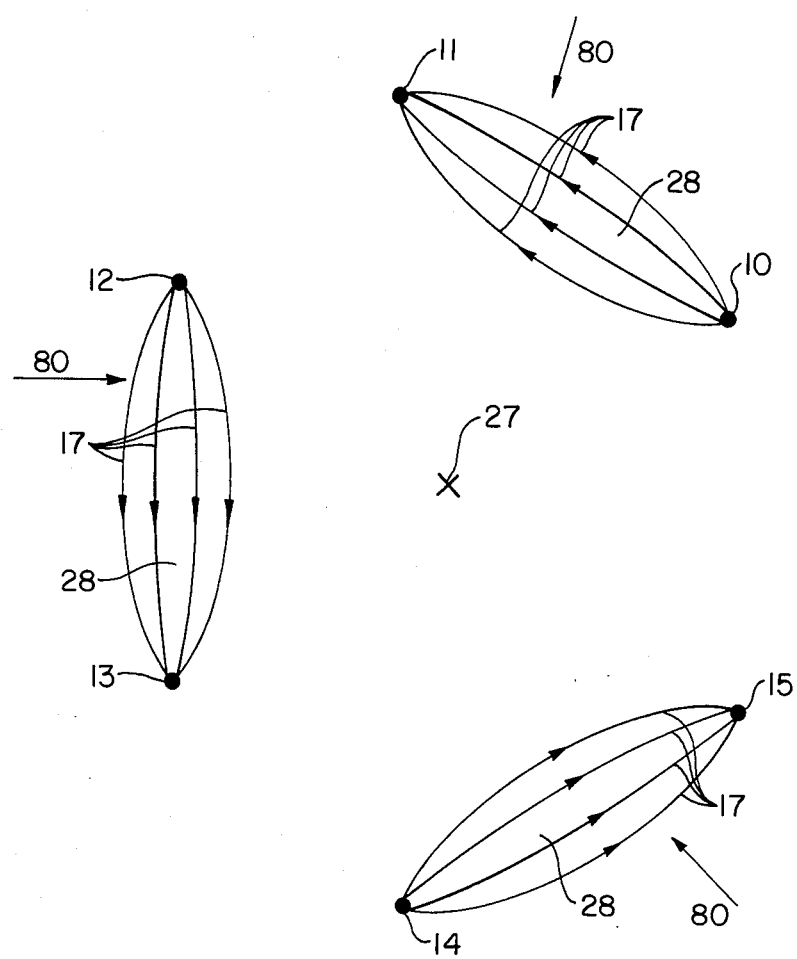
FIG. 1 is a schematic diagram of a configuration of recharge and supply means used in the process of treating water during the operation of Applicants' invention.
Figure 2:
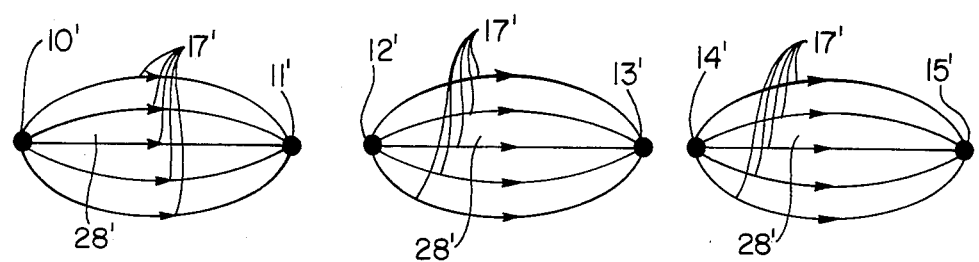
FIG. 2 is a schematic view of a configuration of recharge and supply means used to purify and aquifer.
Figure 3:
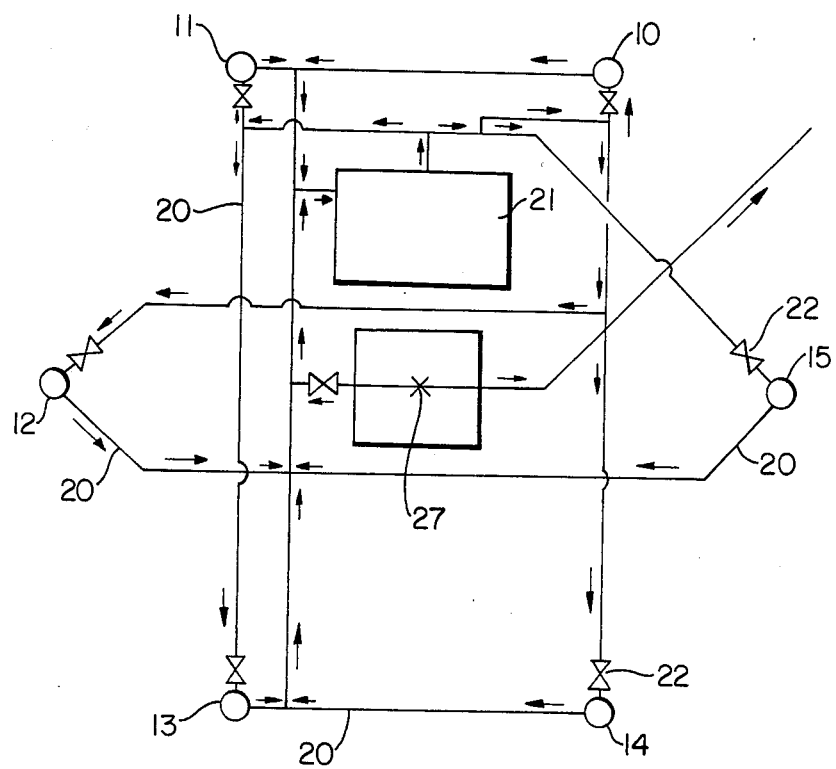
FIG. 3 is a second schematic diagram of the recharge means of FIG. 1, showing a configuration of pipes between recharge means and direction of water flow.

Purified water may be withdrawn through the supply means concurrently with the recharge process through any number of supply means utilized in Applicants' invention; ideally at least one supply means is used therein. however, to effect the purification of ground water in an aquifer where no purified water is intended to be withdrawn, no supply means is required, as shown generally in FIG. 2.

By introducing treated water into the purification system intermittently through at least one recharge means but into less than all of the recharge means, and by withdrawing purified water simultaneously from the nearby adjacent or intervening recharge means, a flow pattern 17 is created and a purification zone 28 for the purification of water is created between such recharge means. Unpurified or raw water flows toward the supply means through the purification zone. Hence, by flowing through the purification zone, unpurified water is rendered essentially free of the contaminants contained therein and sought to be removed, by the methods previously described.

The purification zone 28 is optimally located a sufficient distance from the supply means to prevent clogging or plugging of the supply means with precipitates or contaminants. After introducing conditioned water into a plurality of recharge means, the plurality of recharge means is alternated; conditioned water is then introduced into a different plurality of recharge means thereby utilizing a different purification zone. By alternating purification zones in this manner, the longevity of the system is enhanced, reducing or eliminating the need for restorative treatment, and enabling the user to continuously withdraw purified water from the supply means. The water fed to the recharge means may consist of conditioned water drawn from at least one other recharge means and if desired also a portion of the purified water drawn from the supply means.

By way of example, one supply means surrounded by six (6) recharge means may be utilized in a circular pattern for the removal of metal ions through the introduction into at least one recharge means of oxygenated water and the withdrawal of water from the remaining recharge means.

Conveyance means, such as pipes 20 may be utilized to convey water to and from the recharge means, from the supply means, and to and from the conditioning means 21 through the use of selectively placed valves 22.

Unconditioned water may be withdrawn from recharge means 11, 13 and 15, and conditioned water may be introduced into recharge means 10, 12 and 14. After a predetermined period, the pluralities described above may be alternated, whereby unconditioned water would be withdrawn from recharge means 10, 12 and 14, and conditioned water introduced into recharge means 11, 13 and 15. Alternatively, the plurality of recharge means could be varied in a different manner.

It is unnecessary to arrange the recharge means symetrically around the supply means; any configuration may be utilized. Where natural geohydrological conditions require that a supply means be extremely deep, Applicants' invention may be modified to utilize a deep supply means and a plurality of shallow recharge means. Insofar as many aquifers are comprised of several water-bearing layers, separated by impermeable or semi-permeable layers, the water contained in and withdrawn from the deep supply means may be pumped up from the lower-most water-bearing layers and fed to a plurality of shallow recharge means, thereby allowing such water to flow on a higher water-bearing layer, where the filtration and purification process according to Applicants' invention is carried out.

Applicants' invention is useful for and encompasses the purification of ground water contained in and flowing through aquifer as shown in FIG. 2. If for example, a high concentration of iron and/or manganese is contained in the ground water, conditioning the water by oxygenation or by admixing oxygen-releasing substances in the water, and introducing said conditioned water into the aquifer through at least one recharge means 10' through 15' is appropriate, creating flow pattern 17' and the purification zone 28'. If a different contaminant is to be removed from the water, treatment of the water to be introduced into the aquifer may include any appropriate chemical or biological component necessary to effect purification.

The combination of recharge means 10' through 15' chosen for introductin of conditioned water into the aquifer, the amounts of conditioned water introduced into the recharge means, the supply rate for the withdrawal of purified water from the supply means and the rate of extraction from the recharge means will vary within wide limits, as determined by local geohydrological conditions and the needs of the user.

In another alternative embodiment (not shown) of Applicants' invention, the filtration and purification system may be used for the purification of ground water or surface water in a basin configuration, wherein a filter comprised of naturally occurring or man-made material is contained and utilized. For example, soil may be excavated to form a basin-shaped cavity with a mantle surface, and a sealing layer of clay, concrete, plastic, water-resistant cloth or the like may be applied to the mantle surface to form an inner wall. Recharge means for the introduction of conditioned water, are placed inside the mantle within the basin, and the basin is filled with a filter material, such as sand. The supply means may be located in the center of the basin; the recharge means for introducing treated water are arranged between the mantle and the basin center, around the interior of the periphery of the inner wall of the basin, so as to enable the introduction of conditioned water into the purification system through a plurality of the recharge means, extraction of water through at least one recharge means and the continuous withdrawal of purified water through the supply means. Such a configuration is ideal for the purification of water collected at sanitary landfill sites.

A filter container comprised of steel, plastic, fiberglass or other substance may further be employed instead of a basin. Conditioned water is introduced inside the mantle of the filter container through the plurality of recharge means, and purified water is drawn from a supply means in the center of the container. The recharge means are arranged in a predetermined configuration along the periphery of the mantle within the container, wherein the withdrawal of water from at least one of the recharge means during the continuous withdrawal of purified water from supply extraction means creates a circumferential flow pattern, and purification zones as previously described. Alternating the recharge means used for recharge with the recharge means used for withdrawal of water in this manner effectively alternates the purification zones utilized for the precipitation of contaminants.

Figure 4:
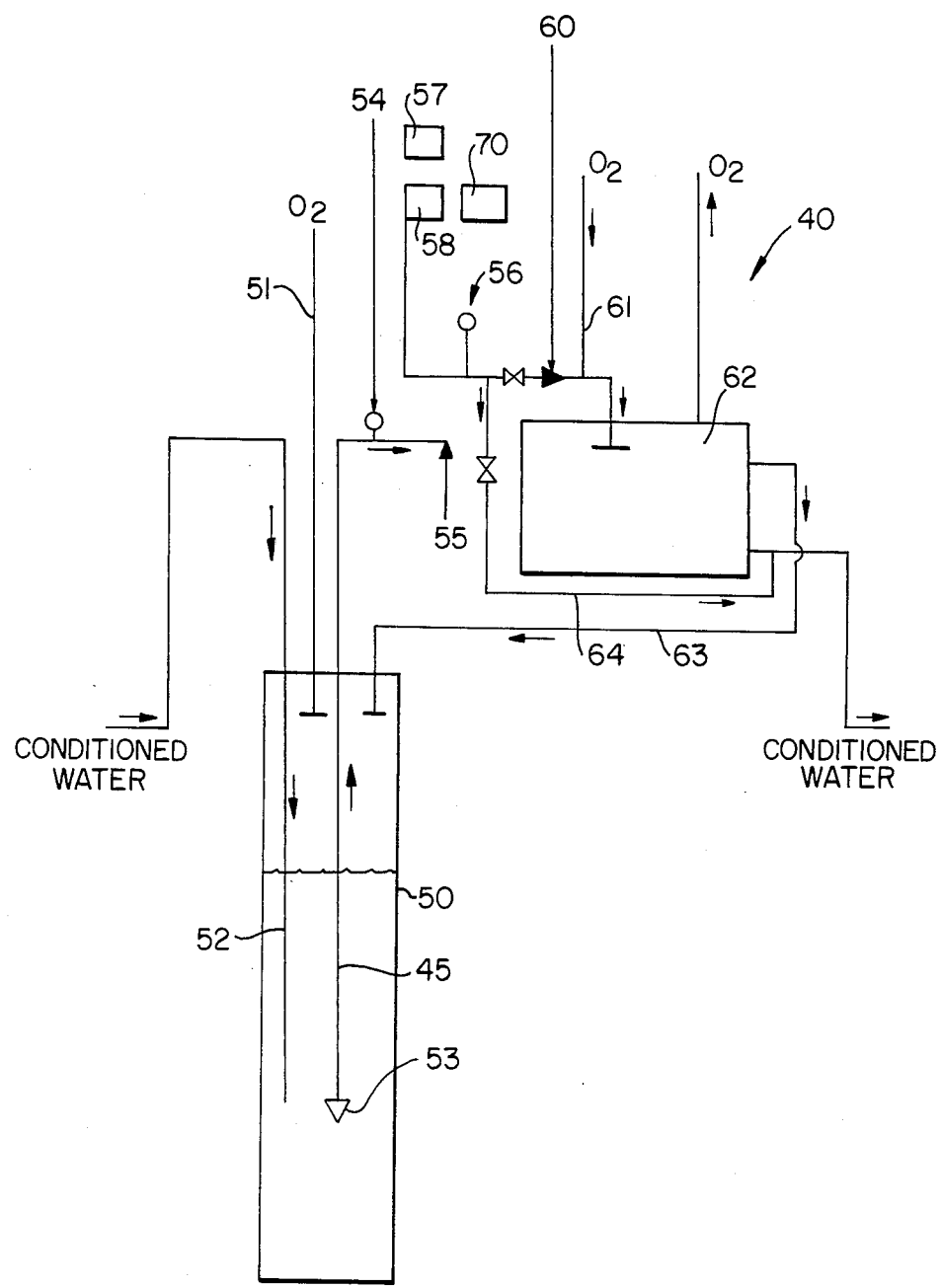
FIG. 4 is a schematic diagram of the purification apparatus.

The preferred alternative embodiment of Applicants' invention encompasses the use of a water treatment apparatus 40 as shown schematically in FIG. 4 in conjunction with the recharge means 50. The treatment apparatus designated generally as 40 may utilize an extraction means 45 which is inserted into the corresponding recharge means 50. The recharge means 50. The recharge may further have a vent 51 if necessary to equalize pressure, or to allow the water level in the recharge means to rise and fall, as well as a recharge pipe 52 for the introduction of treated water into the recharge means when appropriate.

The extraction means may further utilize a one-way foot valve, check valve or similar valve 53 to prevent water from descending in the extraction means, in the event that the vacuum or suction in the extraction means is broken or reduced. The extraction means may further contain a vacuum gauge 54, a suction pump 55, and a pressure gauge 56. The suction pump may be replaced by a positive pressure pump (not shown) such as a submersible pump which may be located in the recharge means. The pump may be controlled by an on-off switch 57 and a motor starter 58 which are controlled by a signal generated in response to a process variable, such as time, volume or water quality. Contained within the treatment apparatus may further be a conditioning means 60, such as an aerator, pipe, aspirator or eductor, which may draw air or oxygen from an air/oxygen intake means 61 or enable introduction of other beneficial additives into the water for treatment purposes. Attached to and in communication with the pipe, aspirator, eductor, etc. may be a conditioning means storage tank (not shown) which serves as the supply for chemicals, gases or other beneficial additives which may be introduced into water taken from the recharge means or the supply means, thereby rendering the water "treated" and suitable for introduction into the recharge means. After a portion of the water withdrawn from the extraction means is conditioned by or within the conditioning means, the conditioned water may be introduced into a holding tank 62. The holding tank may serve as a reaction vessel in that conditioned water may react, become saturated or supersaturated by the chemicals, gas or other beneficial additives introduced into the water over the time period during which the treated water remains in the holding tank. The size of the holding tank may be varied within wide limits to prolong the period during which water is allowed to react with the beneficial agents contained therein prior to introduction into the recharge means. The holding tank may also be ventilated as necessary. Exiting from the holding tank may be a surplus conditioned water return 63, which functions to return surplus treated water to the recharge means. Further, there may be an untreated water bypass means 64 which may enable untreated water to bypass the conditioning means and the holding tank.

It is possible and within the scope of the Applicants' invention to control the return of surplus conditioned water to regulate the holding tank overflow or the water level contained therein. For example, when the withdrawal rate from the holding tank is greater than the return rate to the recharge means, the surplus conditioned water return 63 conveys excess conditioned water back to the recharge means, effectively functioning as an "overflow pipe."

By placing the on-off switches and motor starters of the plurality of recharge means into a centralized programmable system, and by using a common holding tank in a central location, separate from the valves and gauges of any given single water conditioning apparatus, the on-off switches and motor starters corresponding to the plurality of recharge means may be controlled by computer (not shown). This enables the use of conveyance pipes and a single heater, air conditioner or other climate control device 70 to regulate the climate surrounding said portions of the apparatus. Moreover, this allows for pre-determined automatic withdrawal of water to be conditioned from at least one but less than all recharge means, and concurrent introduction of conditioned water into at least one recharge means, regulated in response to system variable signals, such as time, temperature, water volume, water quality, etc. In this manner the specific plurality of recharge means chosen for withdrawal of water may further be automatically changed and alternated with a different plurality of recharge means, and the recharge means chosen for introduction of treated water into the system can be alternated with recharge means from which untreated water was previously withdrawn.

While Applicants have described what is believed to be the preferred embodiment of his invention, other alternatives and embodiments will be obvious to those skilled in the art from the teaching herein. Hence, the scope of Applicants' invention is not to be limited thereby.

What is claimed is:

1. A process for the purification of ground water in a system including a filtering medium comprising an aquifer a plurality of recharge means for injecting water into said filtering medium at a plurality of locations therein, and supply means in said filtering medium spaced from said plurality of recharge means a sufficient distance to avoid clogging of said supply means, said process comprising injecting a supply of conditioned water comprising water containing oxygen or oxygen-releasing substances into a first one of said plurality of recharge means, simultaneously withdrawing water from a second one of said plurality of recharge means adjacent to said first one of said plurality of recharge means so as to create a purification zone between said first and second ones of said plurality of recharge means, and withdrawing purified water from said supply means.

2. The process of claim 1 including conditioning said water withdrawn from said second one of said plurality of recharge means so as to produce conditioned water therefrom, and utilizing said conditioned water as a source of said supply of conditioned water injected into said first one of said plurality of recharge means.

3. The process of claim 1 including injecting said supply of conditioned water into a plurality of said first one of said plurality of recharge means and simultaneously withdrawing said water from a plurality of said second ones of said plurality of recharge means, said plurality of said first and second ones of said recharge means alternating with each other so as to create a plurality of adjacent purification zones between said plurality of said first and second ones of said recharge means.

4. The process of claim 3 wherein said plurality of first and second recharge means substantially surrounds said supply means, whereby said plurality of adjacent purification zones is substantially perpendicular to the direction between said plurality of recharge means and said supply means.

5. The process of claim 4 wherein said plurality of first and second recharge means comprises all of said first and second recharge means, whereby said plurality of said adjacent purification zones substantially entirely surrounds said supply means.

6. The process of claim 1 including utilizing at least a portion of said purified water withdrawn from said supply means as a source of said supply of conditioned water injected into said first one of said plurality of recharge means.

* * * * *

UNITED STATES PATENT AND TRADEMARK OFFICE
CERTIFICATE OF CORRECTION

PATENT NO. : 4,755,304

DATED : July 5, 1988

INVENTOR(S) : Rolf O. Hallberg and Rudolf H. Martinell

It is certified that error appears in the above-identified patent and that said Letters Patent is hereby corrected as shown below:

Column 1, line 49, "'37 gradient"" should read --"gradient"--.

Column 6, line 53, delete "The recharge means 50.".

Column 6, line 54, after "recharge", insert --means--.

Signed and Sealed this

Third Day of January, 1989

Attest:

DONALD J. QUIGG

Attesting Officer

Commissioner of Patents and Trademarks